United States Patent
Naumann

(10) Patent No.: US 8,863,805 B2
(45) Date of Patent: Oct. 21, 2014

(54) PRESSING-ON DEVICE FOR PRESSING ON FIBER-REINFORCED THERMOPLASTIC MATERIALS, FIBER ARRANGING DEVICE, AND METHOD FOR ARRANGING A FIBER-REINFORCED THERMOPLASTIC MATERIAL

(75) Inventor: Niko Naumann, Stadtbergen (DE)

(73) Assignee: Airbus Operations GmbH, Hamburg (DE)

( * ) Notice: Subject to any disclaimer, the term of this patent is extended or adjusted under 35 U.S.C. 154(b) by 184 days.

(21) Appl. No.: 13/201,674

(22) PCT Filed: Feb. 4, 2010

(86) PCT No.: PCT/EP2010/051374
§ 371 (c)(1),
(2), (4) Date: Sep. 2, 2011

(87) PCT Pub. No.: WO2010/091997
PCT Pub. Date: Aug. 19, 2010

(65) Prior Publication Data
US 2012/0073749 A1    Mar. 29, 2012

Related U.S. Application Data

(60) Provisional application No. 61/153,042, filed on Feb. 17, 2009.

(30) Foreign Application Priority Data

Feb. 16, 2009    (DE) .......................... 10 2009 009 186

(51) Int. Cl.
*B29C 65/70* (2006.01)
*B29C 70/38* (2006.01)
*B29K 101/12* (2006.01)

(52) U.S. Cl.
CPC .............. *B29C 70/38* (2013.01); *B29K 2101/12* (2013.01)
USPC ............................ 156/523; 156/581; 156/582

(58) Field of Classification Search
USPC ......... 156/523, 574, 577, 173–175, 581, 582; 425/87
See application file for complete search history.

(56) References Cited

U.S. PATENT DOCUMENTS

| 4,601,775 A | 7/1986 | Grone |
| 4,828,598 A * | 5/1989 | Imamura et al. ................. 65/104 |

(Continued)

FOREIGN PATENT DOCUMENTS

| CN | 101001743 | 7/2007 |
| DE | 102006058097 A1 | 6/2007 |
| DE | 102006058584 A1 | 6/2008 |
| EP | 0361997 A1 | 4/1990 |
| EP | 0411995 A2 | 2/1991 |
| EP | 1211052 A1 | 6/2002 |
| EP | 1775108 A1 | 4/2007 |
| JP | 62-037161 | 2/1987 |
| JP | 02-128836 | 5/1990 |
| JP | 03-112630 | 5/1991 |
| JP | 04-083714 | 3/1992 |
| JP | 05-286056 | 11/1993 |
| JP | 10-050300 | 2/1998 |
| JP | 2004299984 A | 10/2004 |
| JP | 2005297513 A | 10/2005 |
| JP | 2005329593 A | 12/2005 |
| JP | 2008508435 A | 3/2008 |
| JP | 2008-145832 A | 6/2008 |
| WO | 2007076775 A1 | 7/2007 |

OTHER PUBLICATIONS

Jun et al., "Aerogels—A type of structure controllable new functional materials", Materials Science & Engineering, vol. 12, No. 3, Sep. 1994 (English translation of Abstract provided).

*Primary Examiner* — Katarzyna Wyrozebski Lee
*Assistant Examiner* — Scott W Dodds
(74) *Attorney, Agent, or Firm* — Lerner, David, Littenberg, Krumholz & Mentlik, LLP

(57) ABSTRACT

A pressing-on device for pressing fiber-reinforced thermoplastic materials onto a mold is described. The pressing-on device has a main body and a pressing-on layer provided on a surface of the main body. The pressing-on layer is implemented in this case using an inorganic material, preferably a ceramic material, and has a flexibility because of its structure which allows it to adapt itself to the contour of a mold. Increased heat resistance of the pressing-on device and improved properties of the processed fiber-reinforced thermoplastic material can be achieved.

11 Claims, 1 Drawing Sheet

(56) References Cited

U.S. PATENT DOCUMENTS

| | | |
|---|---|---|
| 4,990,213 A | 2/1991 | Brown et al. |
| 5,074,948 A | 12/1991 | Greffioz et al. |
| 5,176,785 A | 1/1993 | Poyet et al. |
| 5,314,563 A | 5/1994 | Grimshaw et al. |
| 6,390,169 B1 | 5/2002 | Johnson |
| 2004/0220032 A1* | 11/2004 | Nakayama et al. ............ 492/40 |
| 2007/0048046 A1* | 3/2007 | Tamemasa .................... 399/333 |
| 2007/0066469 A1* | 3/2007 | Reichert et al. ................ 492/56 |
| 2008/0083505 A1 | 4/2008 | Cope et al. |
| 2008/0093026 A1* | 4/2008 | Naumann .................... 156/378 |

\* cited by examiner

PRESSING-ON DEVICE FOR PRESSING ON FIBER-REINFORCED THERMOPLASTIC MATERIALS, FIBER ARRANGING DEVICE, AND METHOD FOR ARRANGING A FIBER-REINFORCED THERMOPLASTIC MATERIAL

CROSS-REFERENCE TO RELATED APPLICATIONS

This application is a national phase entry under 35 U.S.C. §371 of International Application No. PCT/EP2010/051374, filed Feb. 4, 2010, published in German, which claims the benefit of the filing date of German Patent Application No. 10 2009 009 186.6, filed Feb. 16, 2009 and of U.S. Provisional Patent Application No. 61/153,042 filed Feb. 17, 2009, the entire disclosures of which are hereby incorporated herein by reference.

FIELD OF THE INVENTION

The present invention relates to a pressing-on device for pressing on fiber-reinforced thermoplastic materials as well as a fiber arranging device and a method for arranging a fiber-reinforced thermoplastic material.

BACKGROUND OF THE INVENTION

Fiber-reinforced plastic components having a high carrying capacity, with fiber orientation and fiber positioning adapted to stresses, are increasingly used in greatly varying areas of technology. For example, such plastic components can be used in aircraft construction and result in a significant reduction of the weight of the aircraft therein. Such fiber-reinforced plastic components may be produced by laying pre-impregnated fiber strands. In this case, both carbon fibers (CRP—carbon-fiber-reinforced plastic) and also glass fibers (GRP—glass-fiber-reinforced plastic) can be employed to reinforce a plastic material used as the matrix.

During the production of components from thermoplastic fiber-plastic composites, fiber-reinforced plastic tapes are frequently used, which are impregnated and consolidated in a separate, upstream process. These plastic tapes are heated directly before being laid or pressed against a mold and then adapted in the laying point to the geometry of the component or the mold with the aid of a pressing-on device, such as a pressing-on roller, and consolidated. The geometry of the component can be predefined by a plane or curved surface of the mold on which it is laid. Such a method, which can be automated, is referred to as "tape laying" or in English as "tape/tow placement" or "fiber placement", and can be used both for the complete construction and also for the local reinforcement of components.

One possible problem when laying fiber-reinforced thermoplastic materials, for example, in the form of fiber-reinforced plastic tapes, can be that the geometry of a component which is established by a mold, such as a positive mold or a negative mold, can be restricted in that uniform pressing and/or laying of the plastic tapes can be made more difficult by a rigid pressing-on roller and in particular a desired fiber orientation within curved components can only be implemented with difficulty. Convex and concave component curvatures can result in uneven or also sometimes impossible pressing of the impregnated plastic tape onto the mold, to which consolidation deficits can be connected.

Therefore, a requirement can exist for a pressing-on device for pressing on fiber-reinforced plastic materials, which allows improved pressing of the plastic materials against a mold during a laying procedure. In particular, a requirement can exist for a pressing-on device which allows preferably simultaneous laying of multiple tapes of fiber-reinforced plastic materials in a plurality of laying directions in a manner adapted to a plurality of molds, and which further withstands operating conditions, for example, an elevated temperature, occurring during the laying of fiber-reinforced thermoplastic materials in the long term. Furthermore, a requirement can also exist for a fiber arranging device and a method for arranging a fiber-reinforced thermoplastic material on a mold employing such a pressing-on device.

SUMMARY OF THE INVENTION

This requirement can be met by the subject matter of the independent claims. Advantageous embodiments of the invention are specified in the subclaims.

According to a first aspect of the present invention, a pressing-on device for pressing fiber-reinforced thermoplastic materials onto a mold is proposed. The pressing-on device has a main body and a pressing-on layer on a surface of the main body. The pressing-on layer is implemented using an inorganic material. Furthermore, the pressing-on layer is implemented such that it has a flexibility in order to adapt itself to the contour of the mold during the pressing on.

One concept of the present described invention can be described as based on the following idea: Conventional pressing-on devices were frequently formed from organic materials, often based on polymers, and/or coated using a layer made of such organic materials. These organic materials often have a certain flexibility per se, so that these conventional pressing-on devices can have a flexibility because of the production material used, in order to adapt themselves to the contour of a mold when pressing on. Duroplastic fiber-reinforced plastic materials were typically processed using such conventional pressing-on devices.

It has now been recognized that such conventional pressing-on devices can result in problems during the processing of fiber-reinforced thermoplastic materials, such as PEEK (polyetheretherketone), PEKK (polyetherketoneketone), or PPS (polyphenylensulfid) because of the elevated processing temperatures required therein, which are substantially above those of duroplastic materials and can be in the range of greater than 350° C. for PEEK, for example.

A solution to this problem was recognized in implementing the pressing-on layer attached to the main body of the pressing-on device using an inorganic material, such as a ceramic material. Such inorganic materials typically have a higher resistance capability with respect to elevated temperatures.

Since inorganic materials and in particular ceramic materials are frequently hard and brittle per se, the pressing-on layer is to be implemented such that it has a sufficient flexibility to be able to adapt itself as it is pressed onto the contour of the mold, to which the fiber-reinforced materials are to cling. The required flexibility is preferably not achieved on the basis of a material property of the material used for the pressing-on layer, as was frequently in the case in conventional pressing-on devices. Instead, the required flexibility can be achieved by use of a suitable structural design of the pressing-on layer. Details and possible examples thereof are described hereafter.

Possible features, properties, advantages, and alternative embodiments of the invention are specified hereafter.

The pressing-on device can be designed for the purpose of pressing fiber-reinforced thermoplastic materials, which are provided in the form of fiber tapes or tapes, for example, against a mold, whose structure and geometry represents a positive or negative reproduction of the component to be produced, for example. During the pressing-on procedure, the pressing-on device and the mold can be moved relative to one another. The pressing-on device can be designed in the form of a pressing-on roller or a pressing-on squeegee or pressing-on shoe, for example.

The main body of the pressing-on device can have any desired geometry. The main body can give the pressing-on device a basic shape, for example, the form of a roller or squeegee. The main body can be rigid and inflexible. The main body can be made of any desired material, for example, metal, plastic, or ceramic.

The pressing-on layer can be provided on a surface of the main body, which is oriented toward the fiber-reinforced materials to be compressed and/or toward the mold during the pressing-on procedure. In the case of a roller-shaped main body, the pressing-on layer can be situated on a cylindrical surface of the main body. Therefore, the pressing-on layer can be rolled along the mold during the rolling in this case and can thus press the fiber-reinforced material against the mold substantially without friction. In the case of a pressing-on squeegee, the pressing-on layer can be situated on the edge and on the lateral surfaces which contact the mold during the pressing on. The pressing-on layer can have a low thickness in comparison to the dimensions of the main body. For example, a pressing-on layer of 1-5 mm thickness can be provided on a main body having a diameter of 50 mm.

The pressing-on layer is preferably implemented such that it can adapt itself to the contour of the mold as a result of an intrinsic flexibility during the pressing on such that a substantially homogeneous contact pressure occurs between the pressing-on device and the mold. Locally increased contact pressures are to be avoided as much as possible.

According to one embodiment of the present invention, the pressing-on layer is implemented using a ceramic material. The ceramic material can have a high thermal resistance capability, so that damage to the pressing-on layer does not occur even at high processing temperatures of greater than 350° C., for example, preferably greater than 500° C. Because of a high chemical resistance capability and/or a high mechanical abrasion resistance, the use of a ceramic material can also prevent contamination of the fiber-reinforced thermoplastic material to be pressed on by the pressing-on layer. Furthermore, through the use of a suitable ceramic material, health and safety hazards in the event of overheating of the pressing-on layer can be substantially avoided because of the thermal and chemical resistance capability. For example, aluminum oxide ($Al_2O_3$), silicon oxide ($SiO_2$), magnesium oxide (MgO), or chromium oxide ($Cr_2O_3$) and mixtures thereof can be used as possible ceramic materials.

According to an alternative embodiment of the present invention, the pressing-on layer is implemented using an aerogel, which may be fiber-reinforced. Such aerogels have a very low thermal conductivity in the range around 0.02 W/m*K, having rigidities in the range of less than 1 MPa to 100 MPa, the lower rigidities being preferred because of the better surface adaptivity. Aerogels have temperature resistances of up to 1200° C.

According to a further embodiment of the invention, the pressing-on layer is implemented such that it has a flexibility as a result of its structural design. In other words, the pressing-on layer can have a flexibility not because of or not exclusively because of properties typical to the material, but rather is to obtain the flexibility as a result of structural properties. For example, materials which are hard, brittle, and inflexible in the solid state (bulk) such as many ceramic materials, can be implemented as a result of suitable geometric structures such that a certain flexibility results. Thin-walled substructures such as so-called rovings, tows, braids, threads, or short-fiber fleece having layer thicknesses or diameters of less than 500 μm layer thickness, for example, can contribute to a sufficient mechanical flexibility. These textile semifinished products can in turn be constructed from a plurality of individual filaments having less than 100 μm thickness, for example.

According to a further embodiment of the invention, the pressing-on layer is implemented using a woven textile material, a nonwoven material having a scrim made of a loose fibrous web, a fleece material having a meshing configuration of fibers, and/or a multilayered stack made of thin paper layers. Such materials can preferably be composed of ceramic fibers. Ceramic fiber products can have a temperature resistance of greater than 1200° C., up to 1600° C., and very low thermal conductivities of less than 0.4 W/m*K aufweisen. Ceramic fiber products are offered, for example, by Kager GmbH Industrieprodukte in Dietzenbach (Germany).

According to a further embodiment of the invention, the pressing-on layer is implemented using a material which resists temperatures of up to 350° C., preferably up to 600° C., and more preferably up to 900° C. or even greater. In other words, the material of the pressing-on layer is to withstand the listed temperatures without lasting damage. In particular, it can be advantageous for the material to withstand the temperatures in such a way that the pressing-on layer also maintains its structural and/or functional properties at these elevated temperatures, as can occur during the processing of fiber-reinforced thermoplastic materials.

According to a further embodiment of the invention, the pressing-on layer is implemented using a material which has a thermal conductivity of less than 1 W/m*K, preferably less than 0.5 W/m*K, at a temperature in the range of approximately 1000° C. Because of the low thermal conductivity, the pressing-on layer contributes to good thermal insulation between the heated fiber-reinforced thermoplastic materials to be processed and the main body of the pressing-on device. Although the main body, which frequently comprises metal, can have a high thermal conductivity and heat capacity, a high level of heat transfer from the hot thermoplastic materials to the pressing-on device can thus be substantially avoided. Therefore, the thermoplastic materials can be prevented from being strongly cooled by the pressing-on device during the pressing on, which could otherwise worsen cross-linking and diffusion within the thermoplastic materials. Because of the low thermal conductivity within the pressing-on layer, a rapid heat loss of the thermoplastic material to be processed can thus be prevented and because of the improved cross-linking and diffusion, a quality of the component finally produced from the thermoplastic material can be improved.

According to a further embodiment of the invention, the pressing-on device further has a temperature control unit for the temperature control of the main body. For example, the main body can be heated with the aid of the temperature control unit to an elevated temperature in order to further reduce heat transfer from the hot thermoplastic material to the main body during the pressing on. On the other hand, the main body can be intentionally cooled with the aid of the temperature control unit, in order to prevent lasting damage to the main body due to the continuous introduction of heat into the main body, e.g., during the pressing on of the hot thermoplastic material. For example, a water cooler, an air cooler, a Peltier cooler, or similar heating units can be used as the temperature control unit.

According to a further embodiment of the invention, the pressing-on layer is glued onto the main body. The shape of the main body can be machined very precisely, for example, by lathing a corresponding metal main body into the form of a roller. The pressing-on layer can then subsequently be glued onto the surface of the main body. In the case of a pressing-on layer made of ceramic material, special ceramic adhesives can be used for this purpose. Special high-temperature capable ceramic adhesives are offered, for example, by Polytec PT GmbH Polymere Technologien in Waldbronn (Germany) (www.polytec-pt.de). If necessary, such an adhesive bond can be detached by chemical or mechanical means and the pressing-on layer can then be removed again, in order to replace it after corresponding wear or due to contamination by the thermoplastic material, for example.

According to a further embodiment of the invention, the pressing-on layer can be drawn onto the main body using tubular textile semifinished products. For example, a braid can be drawn over a main body similarly to a stocking.

According to a further aspect of the invention, a fiber arranging device is proposed which, in addition to a pressing-on device as was described above, additionally has a supply device for supplying a fiber-reinforced thermoplastic material to the pressing-on device, as well as a heating device for heating the fiber-reinforced thermoplastic material to a plasticizing temperature.

According to a further aspect of the invention, a method for arranging a fiber-reinforced thermoplastic material on a mold is proposed, the method comprising the provision of a fiber-reinforced thermoplastic material, the heating of the fiber-reinforced thermoplastic material to a plasticizing temperature, and the pressing of the fiber-reinforced thermoplastic material on the mold using the above described pressing-on device.

In the fiber arranging device and in the fiber arranging method, a fiber-reinforced thermoplastic material can be provided or supplied in the form of tapes or mats, for example. The fiber-reinforced thermoplastic material can be a fabric or scrim made of fibers, for example, carbon fibers or glass fibers, which is pre-impregnated using a high-quality thermoplastic material such as PEEK, PEKK, or PPS, for example. In other words, fibers can be laid in a matrix made of thermoplastic material. The direction of the fibers can be adapted to a strain direction to be expected within the component to be produced. The fiber reinforcement is typically provided as a unidirectional reinforcement and is oriented along the main force flows in the process.

To be able to process the fiber-reinforced thermoplastic material and in particular to be able to form a component by layering individual plies made of fiber-reinforced thermoplastic material one on top of another, the thermoplastic material is heated to a plasticizing temperature. At the plasticizing temperature, the thermoplastic material can be plastically deformed, on the one hand, and can bond to adjoining layers of thermoplastic materials through cross-linking and diffusion, on the other hand. Typical processing temperatures, i.e., those temperatures above the melting temperature at which a sufficiently low viscosity is provided for thermoplastic materials may be in the range of greater than 350° C. In order to be able to heat the thermoplastic material to such high temperatures, it can be flushed using heated gas, which can have temperatures of up to 900° C., with the aid of the heating device, for example. Alternatively, the heating device can also locally optically heat the thermoplastic material with the aid of a laser or an infrared heater, for example.

The thermoplastic material plasticized in this way is then pressed using the above-described pressing-on device against the mold or against layers of thermoplastic material already applied in preceding method steps. The thermoplastic material can optionally bond to the previously deposited material layers and cure through cooling of the thermoplastic material.

Because of the uniform pressing on of the thermoplastic material by the advantageously implemented pressing-on device described herein as a result of the flexibility of the pressing-on layer and as a result of the possibly slight heat transfer from the hot thermoplastic material to the main body and the slow cooling of the thermoplastic material thus caused during the processing, a very high interlaminar strength of the component formed by the laminate can hereby potentially be achieved.

The features described above with reference to individual embodiments of the present invention can be combined as desired with one another. In particular, features which were described for the pressing-on device or the fiber arranging device can also be combined with features which were described for the method for arranging the fiber-reinforced thermoplastic material.

The above-described and further aspects, features, and advantages of the present invention may be derived from the following description of specific embodiments and with reference to the appended drawings.

BRIEF DESCRIPTION OF THE DRAWINGS

The drawings are each only schematic sketches. Identical or similar reference signs in the drawings identify identical or similar elements.

DETAILED DESCRIPTION OF EMBODIMENTS OF THE INVENTION

Figure 1:
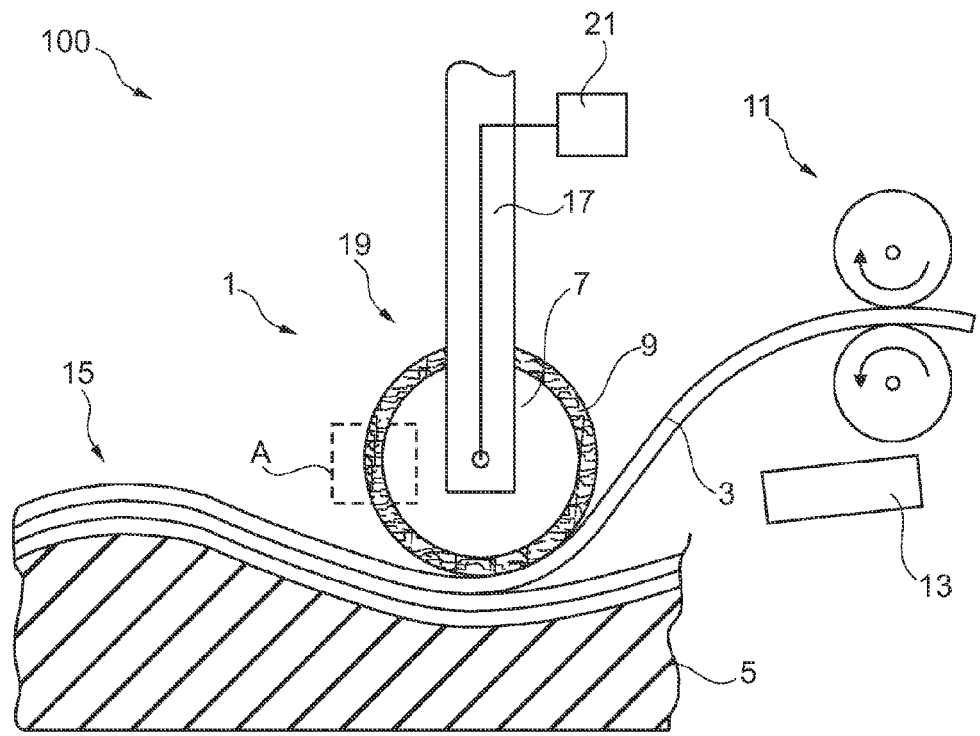
FIG. 1 shows a rough schematic side view of a fiber arranging device having a pressing-on device according to an embodiment of the invention.

FIG. 1 shows a fiber arranging device 100 having a pressing-on device 1, a supply device 11, and a heating device 13 according to an embodiment of the invention. The pressing-on device 1 has a pressing-on roller 19, which is guided on a suspension 17, the roller having a cylindrical main body 7 and a pressing-on layer 9 situated thereon. The main body 7 can be temperature controlled with the aid of a temperature control unit 21.

A laminate layer of fiber-reinforced thermoplastic material 3 is supplied by the supply device 11. The heating device 13 is implemented here as an infrared radiator, which can heat the thermoplastic material 3 to a plasticizing temperature. Alternatively, other heating devices such as a laser or a hot air or hot gas source can also be used. With the aid of the heating device 13, the thermoplastic material is plasticized or melted in an area shortly before the pressing-on roller 19.

With the aid of the pressing-on device 1 and the pressing-on roller 19 located thereon, the laminate layer made of fiber-reinforced thermoplastic material is pressed against a mold 5, which reproduces a component, or against laminate layers previously deposited on this mold 5, in order to form a laminate composite 15. The pressing-on device 1 and the mold 5 can be moved relative to one another for this purpose.

The pressing-on layer 9 attached to the main body 7 comprises an inorganic, preferably ceramic material or aerogel.

Because of its structure, the pressing-on layer 9 has a sufficient mechanical flexibility to be able to compensate for irregularities in the mold or the composite laminate 15 already deposited thereon.

Figure 2A:
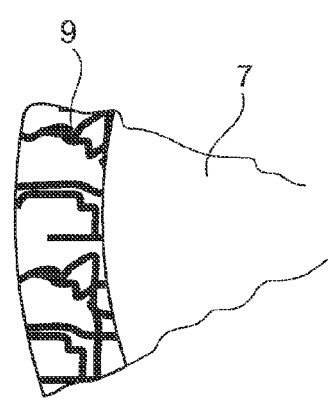
FIGS. 2a and 2b show enlargements of the detail A indicated in FIG. 1 from the pressing-on device according to embodiments of the invention.
Figure 2B:
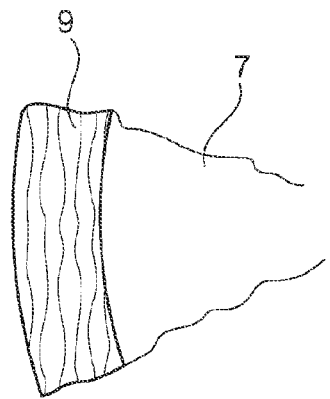

In the enlargement of the area A from FIG. 1 shown in FIG. 2a, a pressing-on layer 9 made of a nonwoven scrim made of ceramic fibers, which is applied to a main body 7, is shown. FIG. 2b shows an alternative embodiment, in which the pressing-on layer 9 is implemented with the aid of multiple layers of a thin paper made of ceramic material. The material used for the pressing-on layer 9 is to have a fine surface structure and is to be held together using only a small quantity of binder as much as possible, in order to avoid a coarse laminate surface and contamination of the laminate.

Finally, the invention can be represented in summary and in other words once again as follows: According to an embodiment of the invention, an inorganic material, such as a high temperature ceramic, is used as a contour-adaptive layer on a pressing-on device. Since ceramics in the form of a solid block are hard and brittle per se and are therefore unsuitable for the described pressing-on procedure, the ceramic material is to be provided in the form of a textile woven fabric, a nonwoven material, or multiple layers made of thin paper, for example, in order to ensure sufficient softness and elasticity. The materials used for the pressing-on layer can resist high processing temperatures and can adapt well to a contour of a mold. An additional advantage can be that the good thermal insulation properties of ceramics can support the formation of cross-linking and diffusion during the laying of individual laminate layers made of thermoplastic material, since they can reduce the cooling speed of the laminate during the laying. In addition, hot gas, such as nitrogen or ambient air, can be conducted into the pressing-on device, in order to further slow the cooling. This potentially results in a higher interlaminate strength of the laminate Finally, it is to be noted that the terms "comprise", "have", etc., do not preclude the presence of further elements. The term "one" also does not preclude the presence of a plurality of objects. The reference signs in the claims are used only for better readability and are not to restrict the scope of protection of the claims in any way.

LIST OF REFERENCE SIGNS 1 pressing-on device
3 fiber-reinforced thermoplastic material
5 mold
7 main body
9 pressing-on layer
11 supply device
13 heating device
15 laminate composite
17 suspension
19 pressing-on roller
21 temperature control unit
100 fiber arranging device

The invention claimed is:

1. A pressing-on device for pressing a fiber-reinforced thermoplastic material, wherein the pressing-on device comprises:
a mold;
a main body;
a pressing-on layer on a surface of the main body;
wherein the pressing-on layer consisting of one of a ceramic material and an aerogel of an inorganic material; and
wherein the pressing-on layer is implemented to have a flexibility to adapt itself to the contour of the mold when the pressing-on layer is pressed on;
wherein the pressing-on layer is implemented to have the flexibility as a result of a structural design of the pressing-on layer; and
wherein the main body is configured to move along the mold.

2. The pressing-on device according to claim 1, wherein the pressing-on layer comprises at least one of a woven textile material, a nonwoven material, and a multilayer stack made of thin paper layers.

3. The pressing-on device according to claim 1, wherein the pressing-on layer comprises a material which resists temperatures up to 500° C.

4. The pressing-on device according to claim 1, wherein the pressing-on layer comprises a material which has a thermal conductivity of less than 1 W/m*K.

5. The pressing-on device according to claim 1, further comprises a temperature control unit for the temperature control of the main body.

6. The pressing-on device according to claim 1, wherein the main body is in the form of a roller and the pressing-on layer is situated on a cylindrical surface of the main body.

7. The pressing-on device according to claim 6, wherein the main body is configured to roll along the mold.

8. The pressing-on device according to claim 1, wherein the pressing-on layer is glued onto the main body.

9. The pressing-on device according to claim 1, wherein the pressing-on layer is drawn onto the main body as a tubular woven or laid textile semifinished product.

10. A fiber arranging device comprising:
a pressing-on device according to claim 1;
a supply device for supplying a fiber-reinforced thermoplastic material to the pressing-on device;
a heating device for heating the fiber-reinforced thermoplastic material to a plasticizing temperature.

11. A method for positioning a fiber-reinforced thermoplastic material on a mold, wherein the method comprises the steps of:
providing a fiber-reinforced thermoplastic material;
heating the fiber-reinforced thermoplastic material to a plasticizing temperature; and
pressing the fiber-reinforced thermoplastic material against the mold using a pressing-on device according to claim 1.

* * * * *